United States Patent Office 2,902,096
Patented Sept. 1, 1959

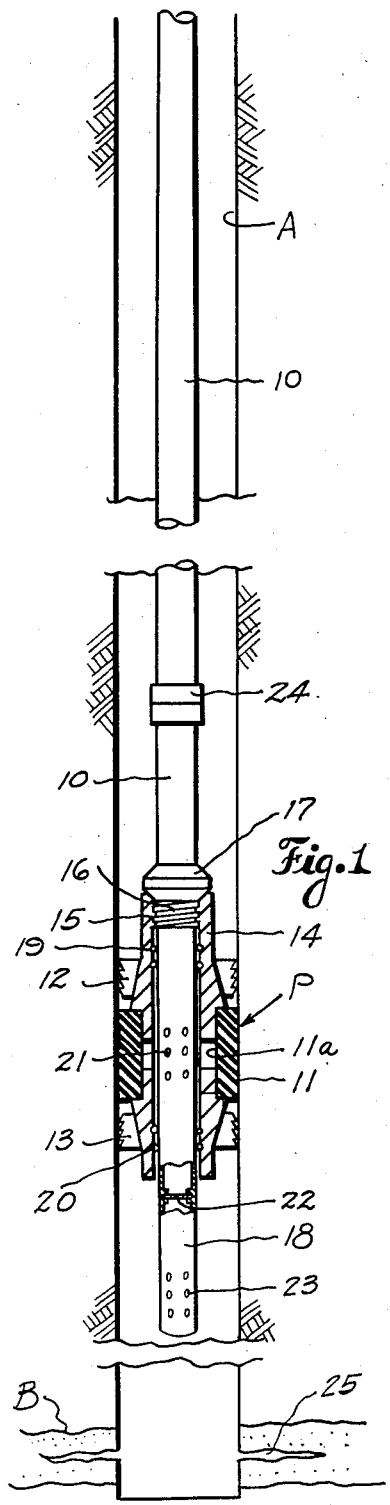
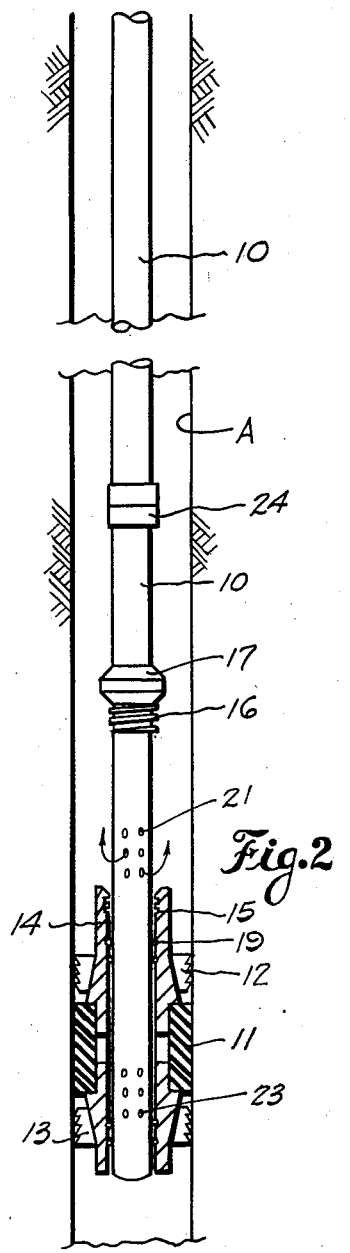

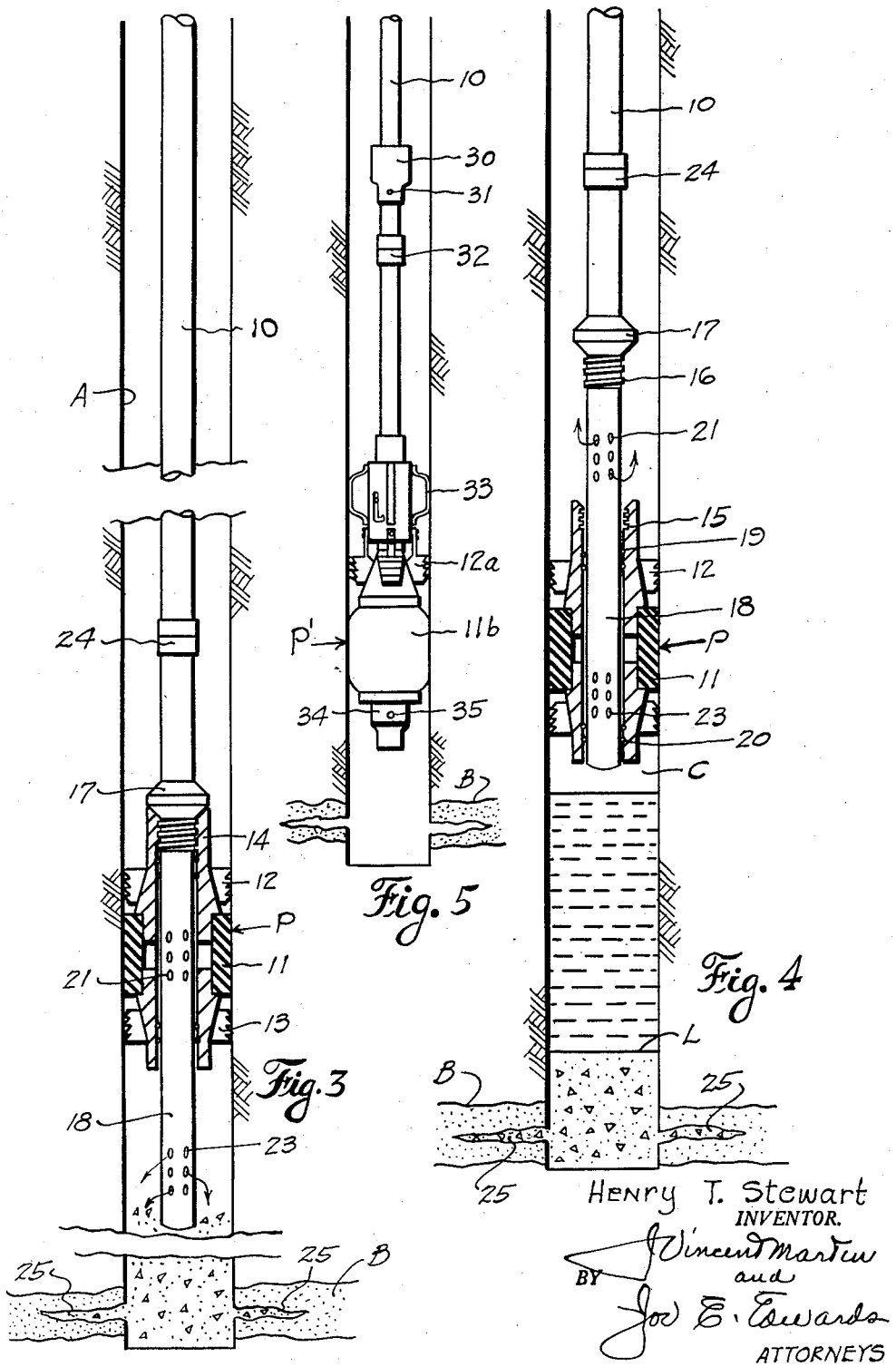

2,902,096

MEANS FOR SHUTTING OFF LOST CIRCULATION IN WELL BORES

Henry T. Stewart, Casper, Wyo.

Application June 11, 1956, Serial No. 590,526

3 Claims. (Cl. 166—228)

This invention relates to new and useful improvements in means for shutting off lost circulation in well bores.

In the drilling of wells, it often occurs that the well bore traverses a formation which is of such character that the drilling mud or fluid enters the interstices or cavities of said formation to such an extent that the maintenance of the usual circulation of said drilling mud downwardly through the drill pipe and upwardly through the annulus in the usual manner becomes difficult if not impossible. These types of subsurface formations which are capable of taking the drilling fluid are commonly referred to as "lost circulation zones" and the only remedy is to halt drilling operations and to seal off such zones, usually by cementing the same. The usual cementing method merely involves the pumping of cement downwardly into the formation by the so-called squeeze technique but such method makes no provision for the adverse effect which the hydrostatic pressure may have upon the cementing operation.

It is one object of this invention to provide an improved method for cementing off subsurface formations which are lost circulation zones, whereby the adverse effect of hydrostatic pressure on the cementing operation is completely eliminated to assure an efficient cementing off of said lost circulation zone.

An important object is to provide an improved method of cementing off a lost circulation zone wherein the cement is pumped downwardly through the well pipe to the zone in the usual manner and after the cement is placed, a positive shut-off or closure between the upper end of the cement and the area thereabove within the well bore is made, whereby any tendency of the cement to continue to enter the formation forming said zone after the cement is in place will create a vacuum or suction effect in the area above the cement which vacuum or suction effect will prevent further movement of the cement into said formation to thereby assure an effective sealing off of said formation.

Still another object is to provide a method, of the character described, which includes the setting of the cementing packer and the establishment of circulation downwardly through the cementing pipe and upwardly through the annulus above said packer; said circulation being established prior to the placement of the cement for the purpose of assuring that the packer is set above the lost circulation zone and said circulation being established subsequent to the cementing operation for the purpose of cleaning out the cementing pipe and the annulus above the set packer.

A further object is to provide an apparatus for carrying out the improved method, which apparatus includes a cementing packer of any desired construction and which has valve or other means for closing off the area above the cement after the latter has been placed and which also has valve or other means for establishing circulation of fluid through the cementing pipe string and annulus at the desired times; said valve means being preferably controlled by suitable manipulation of said pipe string from the surface.

The construction designed to carry out the invention will be hereinafter described, together with other features thereof.

The invention will be more readily understood from a reading of the following specification and by reference to the accompanying drawings forming a part thereof, wherein an example of the invention is shown and wherein:

Figure 1 is a vertical sectional view of the apparatus constructed in accordance with the invention for carrying out the improved method; the apparatus being shown more or less schematically and omitting the structural details of the cementing packer which may be of any well known construction;

Figures 2, 3 and 4 are views similar to Figure 1 and illustrating the steps of the method, Figure 2 showing circulation within the well pipe and annulus prior to the cementing operation, Figure 3 showing the cement being placed, and Figure 4 again illustrating the circulation established after placement of the cement; and Figure 5 is a vertical, sectional view of a modified form of apparatus for carrying out the method.

In the drawings, the letter A designates a well bore which is drilled downwardly through the earth's surface and which is illustrated as traversing a subsurface formation B. The formation B is of such character that the usual drilling mud or fluid which is normally circulated downwardly through the drill pipe and bit and returns upwardly through the annulus enters said formation. It is assumed that the formation B is capable of taking this drilling mud or fluid to the point where it is difficult to sustain circulation during normal drilling. This type of formation is commonly referred to as a "lost circulation zone" and it becomes necessary to seal off this formation in order to continue with the drilling operation.

For accomplishing the cementing off of the formation or lost circulation zone B, the apparatus of this invention is provided and includes the usual cementing pipe 10 which, as shown, is adapted to have a cementing packer P mounted on its lower portion. The particular construction of the packer P is subject to variation and any of the well known cementing packers now in general use may be employed; it is pointed out that the cementing packer may be of the retrievable type which is removable after the cement is placed or may be of the permanent type which is drilled out, both of these types being common in the industry. As schematically illustrated in Figures 1 to 4, the packer P is of the retrievable type and includes a packing element or sleeve 11 which is constructed of rubber or other suitable elastic material, an upper slip assembly 12 and a lower slip assembly 13. When the packer is set within the well bore A, the sleeve 11 sealingly engages the wall of the well bore and the upper slip assembly 12 locks the packer against upward movement within said bore; at the same time, the lower slip assembly 13 locks the packer against downward movement.

The cementing packer P is one of the well known types in which the packing element 11 is expanded by hydraulic means and the mandrel 14 of said packer is adapted to be detachably connected to the lowering pipe 10. For purposes of illustration, the detachable connection is shown as relatively coarse threads 15 formed in the upper end of the mandrel 14 which are engageable by external threads 16 provided on the lowering pipe 10, the parts being shown in their connected position in Figure 1. An enlargement 17 is provided on the pipe 10 immediately above the connecting threads and when said pipe is connected to the packer the enlargement 17 is in engagement with the upper end of the packer mandrel.

Below the threads 16 the pipe string is formed with a tail pipe section 18 which extends downwardly through the bore of the packer and into the area therebelow. The outer surface of the tail pipe section is sealed with the bore of the packer mandrel by O-rings 19 which are disposed just below the connecting threads 15. The lower end of the packer bore is also sealed with the tail pipe section by O-rings 20 which are disposed in the lower portion of the packer.

When the cementing or lowering pipe 10 is connected to the packer P, as illustrated in Figure 1, a plurality of ports 21, which are formed in the tail pipe section, are in communication with the area between the O-ring seals 19 and 20. This area is, in turn, in communication with the bore 11a of the packer sleeve 11 and with the expanders of the slips 12 and 13. Below the ports 21 and disposed within the bore of the tail pipe section 18 is a frangible disk 22 which closes the bore of said section below said ports. Below the frangible disk the tail pipe section has cementing ports 23 through which cement pumped downwardly through the pipe 10 may be ejected into the well bore below the packer, as will be explained.

When the frangible disk or closure 22 is in position within the tail pipe section, any fluid pumped downwardly through the pipe 10 is caused to pass outwardly through the ports 21 so that a hydraulic pressure may be applied to the interior of the packer P to effect a setting of said packer P, whereby the slips 12 and 13 are engaged with the pipe and the packing element 11 is sealed with the wall of the pipe in the usual well known manner employed in cementing packers of this type. After the packer is set, sufficient pressure may be built up within the interior of the tail pipe section 18 to fracture the disk or closure 22 and thereby establish communication between the bore of the pipe and the cementing ports 23. A suitable safety joint 24 may be connected in the pipe 10 at some point above the packer P so that in the event the connection at the threads 15 and 16 should for some reason become incapable of disconnection, the main portion of the pipe 10 may be released at the safety joint 24 and removed from the well.

In carrying out the improved method, the apparatus is assembled as illustrated in Figure 1, with the threads 16 on the pipe 10 connected with the threads 15 of the packer. At this time the frangible disk 22 is in place. The formation B is first located by means now in general use and the apparatus is then lowered into the well bore to locate the well packer P above the formation or lost circulation zone B. Pressure is then applied through the pipe 10 to effect a radial expansion of the packer element 11 and the setting of the slips 12 and 13 to set the packer P in position. The frangible closure or disk 22 is of such strength that the pressure required to set the packer may be applied before said disk or closure is fractured. After the packer has been set the pressure within the pipe is then built up to a point which is sufficient to break the disk 22 and open the bore of the tail pipe section 18 whereby the pipe 10 is in communication with the cementing ports 23.

In order to be certain that the packer P is properly set above the lost circulation zone B, the well pipe 10 is manipulated to uncouple the threads 15 and 16; thereafter the pipe 10 is lifted in the manner shown in Figure 2 and such lifting locates the ports 21 above the packer P. The distance between the ports 21 and the cementing openings 23 in the lower end of the tail pipe section is such that the lower cementing ports 23 will move into the area between the O-rings 19 and 20 when the ports 21 are in communication with the area above the packer. With the ports or openings 23 between the O-rings said ports are closed to the area below the packer but are positioned to establish communication between the pipe and the interior of the packer so that the pressure within the pipe will hold the packer in set position. Since the ports 21 have moved above the packer, a circulation of drilling mud or other fluid may be established downwardly through the pipe, outwardly through ports 21 and then upwardly through the annulus between the pipe 10 and the well bore A. If this circulation of fluid through the area above the packer can be maintained, this indicates that the packer is above the lost circulation zone B and that said zone has been properly packed off. If the circulation can not be maintained, this indicates that the packer P has been improperly set at a point below the lost circulation zone B; if the latter condition occurs and a retrievable type packer, as illustrated in Figure 1, is employed, it is only necessary to re-engage the pipe 10, release the pressure on the packer, and re-set said packer at a higher elevation above the zone B.

After the circulating step illustrated in Figure 2 has been carried out and it is assured that the packer P is set above the lost circulation zone B, the pipe 10 is again lowered to re-connect the threads 15 and 16 and the parts are then in the position shown in Figure 3. In such position the ports or openings 23 in the lower end of the tail pipe section are disposed in the area below the packer P and cement may then be pumped downwardly through the pipe 10 and will be ejected outwardly through the ports 23 and into the well bore. Since the ports 23 are above the lost circulation zone, sufficient cement may be pumped downwardly to effect the necessary sealing off of the cavities or interstices 25 of said zone. The volume of cement is determined in the well known manner. Water is pumped through the pipe 10 behind the cement and will of course clean the pipe as it follows the cement downwardly. It is desirable to set the retrievable type of packer at a sufficient distance above the zone B so that enough water may be introduced behind the cement to lower the upper level of the cement well below the packer, whereby a desired amount of hole below said packer may be clear of cement.

After all of the cement has been placed into the area below the packer, said cement will of course be forced into the lost circulation zone and will fill the bore of the well in the area below the upper lever L of said cement. At this time it has been the past practice to merely permit the cement to stay at rest with a hydrostatic head within the pipe acting upon said cement. Obviously a hydrostatic head pressure will tend to urge the cement into the formation and if the formation is of a character to continue to take the cement, all of said cement may be forced into the formation and an ineffective seal-off will result.

In the present method, after the proper volume of cement has been placed within the lower portion of the well bore and within the lost circulation zone or formation B in the manner described, the pipe 10 is again disconnected from the packer by unscrewing the threads 15 and 16 and the pipe 10 is lifted to the position shown in Figure 4. This is the same position which the parts had, as illustrated in Figure 2, and locates the ports 21 in the tail pipe section in communication with the area above the packer. At the same time it places the cementing openings or ports 23 within the area of the packer P between the O-rings 19 and 20. Such location of the ports 23 shuts off all communication between the interior of the pipe 10 and the upper portion of the cement which is located in the area below the packer. The hydrostatic head pressure and the effect thereof is thus completely removed from the cement which is disposed in the lower portion of the bore and which is extending outwardly into the lost circulation zone B. With this hydrostatic head pressure removed from the cement, it will be obvious that any tendency of the formation to take additional cement will create a vacuum or suction effect at the point C in Figure 4. It might be that the cement will move a slight distance out into the formation to create a space at the point C but as soon as the vacuum or suction effect is developed further movement of the cement into the formation will be prevented. Therefore the removal of the effect of hydrostatic head pressure upon the cement makes it possible to locate the cement and then maintain it in placed position so as to assure a proper cementing off of the lost circulation zone.

While the cement is setting, the ports 21, being located above the packer P, permit the establishment of fluid circulation downwardly through the pipe and upwardly through the annulus above the set packer. This permits the pipe 10 to be thoroughly cleaned out by such circulation and the circulation may be maintained during the time the cement is setting. After the cement has been set, the pipe may be removed from the well and the well packer drilled out in the usual manner.

From the foregoing it is evident that the method provides an efficient way of setting the cement at the proper place opposite the lost circulation zone and assures that the cement will not be forced into the formation by a hydrostatic head pressure to make an improper seal. As explained, any suitable type of cementing packer may be employed and said packer may be of the well known permanent type which is initially lowered into position on either a pipe or wire line and which is set either mechanically or hydraulically. After the packer is set, the tail pipe section 18 may be lowered therethrough and then manipulated in the manner above described to carry out the cementing operation.

The particular feature of the invention is the removal of the effect of hydrostatic pressure upon the cement but the method has the added advantage of permitting the establishment of fluid circulation between the pipe and the area above the packer both prior and subsequent to the cementing operation. As noted, the establishment of circulation between the pipe and the annulus area above the packer prior to cementing makes it possible to assure that the packer is set in a proper position; the establishment of this circulation after the cementing operation assures proper clean-out of the pipe 10.

In Figure 5 a slightly modified form of apparatus which is also schematically illustrated includes the lowering pipe 10 having a circulating sub 30 connected therein. The sub is adapted to be operated by rotation of the pipe to open and close circulating ports 31 therein. Below the circulating sub is a safety joint 32, and the well packer P' is of a type generally known as a "hook-wall" packer. This packer has a packing element 11b and slips 12a which are adapted to be set by manipulation of the pipe in the usual manner. In this type of packer friction springs 33 hold the slips stationary while the pipe is manipulated in order to effect a setting of the packer element 11b. A valve 34 having a cementing port 35 is secured to the lower end of the pipe string and is also adapted to be operated by a rotation of the drill pipe. The valve 34 may be opened by right-hand rotation and closed by left-hand rotation while the circulating sub would be operated by reverse rotations, that is, closed by right-hand rotation and opened by left-hand rotation; thus either one or other of the valves 30 and 34 may be opened, and by providing an intermediate position, both valves may be closed at the same time.

The method, as hereinbefore described, may be carried out with the apparatus of Figure 5 in the same manner as it is performed with the apparatus shown in Figures 1 to 4. In both forms of the invention the feature of relieving the cement, after its placement within the well bore, from the adverse effect of the hydrostatic pressure is present.

As mentioned, the particular apparatus is subject to variation and any standard cementing packer, such as those manufactured by Baker Oil Tools of Los Angeles, California, or Brown Oil Tools of Houston, Texas, may be employed. So long as the packer may be set and the pipe manipulated to first place the cement and thereafter shut off the effect of hydrostatic pressure on said cement, the purposes of the invention will be accomplished.

The foregoing disclosure and description of the invention is illustrative and explanatory thereof, and various changes in the size, shape and materials, as well as in the details of the illustrated construction may be made, within the scope of the appended claims, without departing from the spirit of the invention.

What I claim is:

1. An apparatus for shutting off a lost circulation zone within a well bore which includes, a packer adapted to be set within the well bore above said lost circulation zone, a pipe extending downwardly from the surface through the packer, detachable connecting means between the pipe and packer whereby the pipe may be utilized to set the packer, said pipe having its lower end closed and projecting below the packer when in connected position and having a radially extending outlet in said projecting end portion, said lower end portion of the pipe having a sealing surface below the radially extending outlet said pipe also having an opening therein which is located within the bore of the packer when the pipe is connected to the packer, spaced seals mounted on the packer, above and below the opening and sealing between the pipe and packer whereby cement may be pumped downwardly through the pipe and outwardly through the radially extending outlet to place cement in the area below the packer, said pipe being detachable from the packer and movable upwardly relative thereto to locate the radially extending outlet in its lower end within the packer and between the spaced seals and to also dispose the sealing surface on said pipe in a position to coact with the lower seal, whereby said seals shut off communication between the interior of the pipe and the area below the packer.

2. An apparatus for shutting off a lost circulation zone within a well bore which includes, a packer adapted to be set within the well bore above said lost circulation zone, a pipe extending downwardly from the surface through the packer, detachable connecting means between the pipe and packer whereby the pipe may be utilized to set the packer, said pipe having its lower end closed and projecting below the packer when in connected position and having a radially extending outlet in said projecting end portion, said lower end portion of the pipe having a sealing surface below the radially extending outlet said pipe also having an opening therein which is located within the bore of the packer when the pipe is connected to the packer, spaced seals mounted on the packer, above and below the opening and sealing between the pipe and packer whereby cement may be pumped downwardly through the pipe and outwardly through the radially extending outlet to place cement in the area below the packer, said pipe being detachable from the packer and movable upwardly relative thereto to locate the radially extending outlet in its lower end within the packer and between the spaced seals and to also dispose the sealing surface on said pipe in a position to coact with the lower seal, whereby said seals shut off communication between the interior of the pipe and the area below the packer, the upward movement of the pipe which locates the outlet within the packer also locating the opening in said pipe at a point above the packer, and means for circulating fluid downwardly through the pipe, outwardly through the opening and upwardly within the area above the packer.

3. An apparatus for shutting off a lost circulation zone within a well bore which includes, a packer adapted to be set within the well bore above said lost circulation zone, a pipe extending downwardly from the surface through the packer, detachable connecting means between the pipe and packer whereby the pipe may be utilized to set the packer, said pipe having its lower end closed and projecting below the packer when in connected position and having a radially extending outlet in said projecting end portion, said lower end portion of the pipe having a sealing surface below the radially extending outlet, a frangible closure adapted to be fractured by a predetermined pressure within the bore of the pipe above the outlet, said pipe also having a radial opening which is located within the bore of the packer when the pipe is connected to the packer, spaced seals mounted on the packer above and below the opening and sealing between the pipe and packer, means for applying hydraulic pressure to the packer through said radial opening to set the same and to thereafter fracture the frangible closure, the pipe being detachable from the packer after the latter is set and being movable upwardly relative thereto to locate the radial opening above the packer and to locate the radially extending outlet within the packer between the seals, and to also dispose the sealing surface on said pipe in a position to coact with the lower seal, whereby circulation above the packer may be carried out, said pipe being thereafter returnable to its initial connected position with the packer to again locate the radially extending outlet below the packer, and means for pumping cement under pressure downwardly through the pipe and outwardly through the outlet into the area below the packer, said pipe being thereafter disconnectible from the packer and raised to again locate the radially extending outlet within the packer and between the seals to again shut off communication between the pipe and the area below the packer.

References Cited in the file of this patent

UNITED STATES PATENTS

| | | |
|---|---|---|
| 1,474,630 | Halliday | Nov. 20, 1923 |
| 2,101,640 | Chonette et al. | Dec. 7, 1937 |
| 2,163,449 | Owsley | June 20, 1939 |
| 2,189,703 | Burt et al. | Feb. 6, 1940 |
| 2,227,731 | Lynes | Jan. 7, 1941 |
| 2,743,779 | Brown | May 1, 1956 |
| 2,751,009 | Wooddy | June 19, 1956 |